Patented Mar. 11, 1952

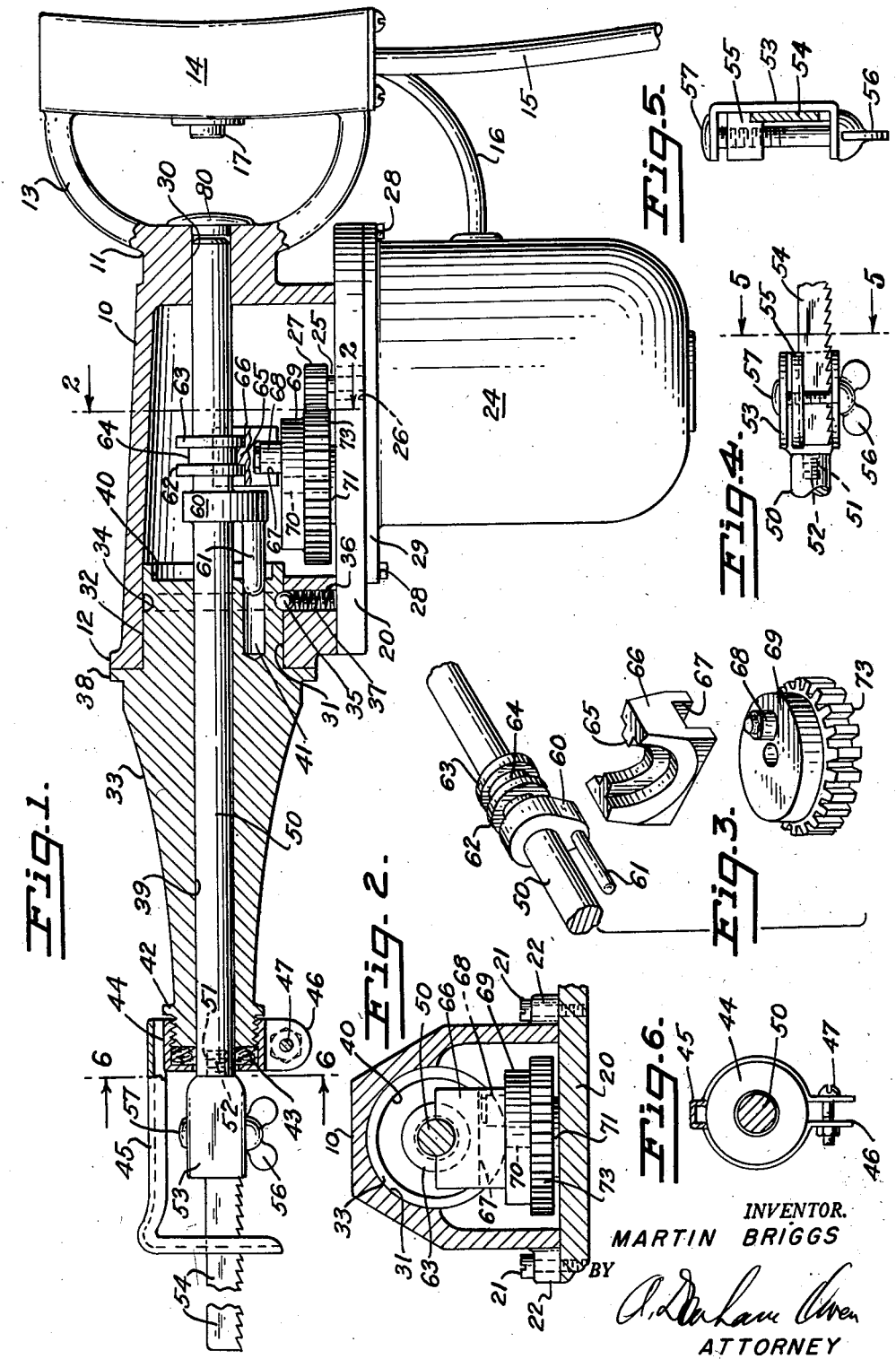

2,588,477

UNITED STATES PATENT OFFICE 2,588,477

POWER TOOL

Martin L. Briggs, Oakland, Calif.

Application November 13, 1947, Serial No. 785,687

5 Claims. (Cl. 143—68)

1

This invention relates to a power tool, and is particularly directed to a portable, motor-driven saw of the reciprocating variety.

Power-driven saws arranged to be held by an individual workman are now available in several types. Some are provided with a rotatable disc-shaped blade, while others incorporate a straight blade arranged for reciprocating movement. The disadvantages and limitations of the disk type of saw are obvious, for it can make only straight cuts whose depth as a general rule is limited to the radius of the blade. These limitations have been overcome, at least in part, by the provision of saws having a reciprocating blade which is supported only at the end adjacent the tool. However, the available reciprocating-blade saws, while more versatile than disc-blade saws, have nevertheless suffered certain disadvantages. One disadvantage has been their lack of a compact and durable assembly for connecting the power source with the reciprocating, blade-driving element. The known transmission devices used for this purpose have been cumbersome and elaborate and so have added greatly to the size and weight of the tool. Further, they have not stood up well under the severe operating conditions which such parts are normally subject to. Although the cost of repair is not always a major item of expense, the loss of the tool for one or more days is a serious handicap to the workman. Lastly, although reciprocating saws are well adapted to make cuts of any desired path, there has been no apparatus by which the cutting direction of the blade can be varied while the tool is sawing. Instead, the operator has been forced to manipulate the whole body of the saw along with the blade.

It is therefore an object of this invention to provide an improved portable saw having a power-driven, reciprocating blade.

A further object is to provide a saw of the foregoing character, the blade of which may be adjusted to any desired cutting angle without manipulating the tool as a whole.

A more particular object is to provide a saw having a reciprocating blade which may be adjusted to any desired cutting angle, both while the power is on and off, simply by rotating a forward portion of the tool which also serves as a grip for the hand nearest the workpiece, the major portion of the tool remaining unrotated.

Another object of the invention is to provide a reciprocating power saw having a compact and durable power transmission system which is also capable of easy assembly and disassembly.

2

Other objects and advantages will appear from the following description of a preferred embodiment of the invention, presented in detail but without intention to thereby narrowly limit the claims.

In the drawings:

Fig. 1 is a side elevational view of a portable, power-driven saw embodying the principles of this invention;

Fig. 2 is a view in section, taken along the line 2—2 in Fig. 1;

Fig. 3 is an exploded view in perspective of the cam mechanism by which the rotational motion of the motor is changed into a reciprocating motion imparted to the saw blade;

Fig. 4 is a view in elevation of the side of the blade-holding chuck opposite that illustrated in Fig. 1;

Fig. 5 is a view in section, to an enlarged scale, along the line 5—5 of Fig. 4; and Fig. 6 is a view in section along the line 6—6 of Fig. 1, showing the mounting of the blade guard.

Referring more in detail to the drawing:

The tool illustrated in Fig. 1 has a central hollow frame piece 10 with ends 11 and 12. The end 11 is integral with a handle 13 having a hollow grip 14. A conductor cord 15 leads into the grip 14 and a conductor cord 16 leads out therefrom, the two lines being joined at a switch (not shown) controlled by a button 17 on the grip 14.

The frame piece 10, which is opened at its bottom, rests on and is secured to a base plate 20 (see Fig. 2) by means of screws 21 which pass through lugs 22 on the frame piece 10 and then thread into the plate 20.

Depending from the plate 20 is a housing 24 in which is mounted an electrical motor (not shown) connected to the cord 16, the motor having a vertical shaft 25 which extends through an opening 26 in the plate 20. The shaft 25 carries a pinion gear 27 at its upper end. The housing 24 is secured to the plate 20 by screws 28 which pass through a flange 29 on the housing.

Extending through the ends 11 and 12 of the frame piece 10 are aligned cylindrical openings 30 and 31, opening 31 having the wider diameter. Rotatably mounted within the opening or socket 31 is the cylindrical end portion 32 of a barrel 33, said portion being provided with an annular groove 34 which serves as a traveling seat for a metal ball 35. The ball, in turn, is confined within a cylindrical radial opening 36 in the frame end 12, and is held against the surface of the groove 34 by an open coil spring 37 whose lower end engages the plate 20. The barrel 33 is flanged at 38 to abut the frame end 12 thereby limiting the entry of the barrel 33 into the opening 31 and serving also to position the groove 34 in exact alignment with the ball 35. Once seated in the groove 34, and for as long as forced therein under the influence of the spring 37, the ball 35, prevents relative lateral displacement of the frame and barrel, though permitting 360 degree rotational movement of one within the other.

The barrel 33 has central bore 39 extending throughout its length, said bore being in alignment with the opening 30 in the frame end 11. The barrel 33 is counterbored at 40, and communicating with said counterbore 40 and paralleling the bore 39 is a cylindrical guide pocket 41.

From its annular flange 38, the barrel is tapered to the annular flange 42 positioned adjacent the outer barrel end 43, this tapered portion of the barrel serving as a grip for one hand of the workman. The barrel is exteriorly threaded from the end 43 to the flange 42, and secured on said threaded portion is a packing nut 44. A slotted blade-guard and work rest 45, is mounted about the nut by means of a clamp 46 having a tightening screw 47 (see Fig. 6).

Slidably mounted within the bore 39 and the opening 30 is a shaft 50. The shaft end adjacent the handle 13 is free, and its other end has a central threaded opening 51 in which is secured the threaded end 52 of a blade-holding chuck 53 (see Figs. 4 and 5). The chuck 53 holds one end of a toothed blade 54 by means of an interiorly threaded clamping member 55 controlled by a thumbscrew 56, the said thumbscrew having an enlarged head 57 to prevent its axial displacement. The blade 54 projects ahead of the tool through the slotted work rest 45.

The shaft 50 bears a collar 60 (see Fig. 3), adjacent the counterbore 40, and the collar 60 in turn carries a forwardly-extending aligning pin 61, which slidably engages within the guide pocket 41 in the barrel 30 to prevent relative rotation between shaft 50 and the barrel.

Adjacent the collar 60 and rearward therefrom, the shaft 50 is encircled by a pair of spaced flanges 62 and 63 which serve to define an annular guideway 64 for a semicircular rail 65 carried on the upper surface of a yoke 66. The lower surface of yoke 66 is provided with a horizontal slot 67 which receives and is supported by a roller 68 secured to an eccentric position on the upper surface of a wheel 69. The wheel 69 is supported rotatably on a stub shaft 70 mounted in the plate 20 and is spaced above the plate by a washer 71. The lower portion of wheel 69 has teeth 73 which mesh with the pinion 27 on the motor drive shaft 25. From this it will be seen that as the wheel 69 is driven by the motor through the pinion 27, the yoke 66 and with it the shaft 50, are alternately moved back and forth as the roller 68 travels from side to side in the slot 67. Further such reciprocating motion on the part of the shaft and yoke is in no way imparted by rotation of the barrel 33 and, with it, the shaft 50 and the blade 54, for the rail 65 is always free to travel 360 degrees between the flanges 62 and 63.

During this reciprocating motion, the end of the shaft 50 in the end bearing 30 will move to the left from its extreme inward position adjacent a face sealing member 80, as illustrated in Fig. 1, the motion in this direction terminating just before the aligning pin 61 reaches the bottom of the guidepocket 41. The shaft then returns to the position illustrated and the cycle is repeated indefinitely as long as the tool is in operation.

It will be evident from the drawings and the foregoing description that the tool of this invention may be readily disassembled and reassembled. The motor and its housing are removed from the base 20 by withdrawing the screws 28, and the base 20 may itself be removed from the frame 10 by withdrawing the screws 21, whether or not the motor housing is still secured to the plate. Once the interior of frame 10 is exposed, the geared wheel 69 is readily removed and so is the yoke 66. With the release of spring 37, the ball 35 falls from its seat against the groove 34, and the barrel 33 with the shaft 50 may be removed from the frame 10. In order to pull the shaft 50 out of the bore 39, the chuck 53 should first be unthreaded from the opening 51, following which the end 52 of the shaft may then be pulled through the bore. Reassembly is done merely by reversing the above steps.

In order to operate the tool, the cord 15 is connected to an electric outlet, and the button 17 is depressed to start the motor. The motor rotates the pinion gear 27 and, through wheel 69 and yoke 66, imparts a reciprocating motion to the shaft 50 and its attached saw blade 54. The blade may be turned to any desired angle whether the saw is running or not, merely by rotating the barrel 33. The pin 61 transmits this rotation to the shaft 50 and blade 54, while the guard and work rest 45 moves with the barrel. The main frame and handle of the tool remain in a relatively stationary position as the blade is thereby turned.

I claim:

1. A power driven device comprising, in combination, a hollow frame; a motor mounted to said frame and connected to a rotating wheel positioned within the frame interior, said wheel carrying an upstanding, offset cam; a barrel rotatably supported by said frame, said barrel having a central bore communicating with the frame interior; an overlength shaft slidably mounted in said bore but fixed against relative rotation therein, the outer end of said shaft carrying a tool-holding chuck and the inner end thereof extending into the frame interior and being provided with a circular groove; and a yoke mounted between said wheel and said shaft, the yoke having a plane camway arranged to confine the cam on rotation of its supporting wheel, and having an arcuate tongue shaped for reception in said groove, the yoke thereby being adapted to convert rotational movement of the wheel into reciprocating movement of the shaft for any rotational position of said shaft and barrel.

2. A power driven saw comprising, in combination, a hollow frame; a motor mounted to said frame and connected to a rotating wheel positioned within the frame interior, said wheel carrying an upstanding, offset cam; a barrel rotatably supported by said frame, said barrel having a central bore communicating with the frame interior; an overlength shaft slidably mounted in said bore but fixed against relative rotation therein, the inner end of said shaft extending into the frame interior and being provided with a circular groove; a blade supporting chuck carried by the outer end of said shaft; a saw blade supported by said chuck; and a yoke mounted between said wheel and said shaft, the yoke having a plane camway arranged to confine the cam on rotation of its supporting wheel, and having an arcuate tongue shaped for reception in said groove, the yoke thereby being adapted to convert rotational movement of the wheel into reciprocating movement of the shaft for any rotational position of said shaft and barrel.

3. A power driven device adapted to drive a reciprocating tool in any desired rotational position, comprising, in combination, a hollow frame; a barrel rotatably supported by said frame and having a central bore communicating with the frame interior; an overlength shaft slidably mounted in said bore but fixed against relative rotation therein, said shaft extending into the frame interior and having a circular track thereon; a tool-supporting chuck supported on the outer end of said shaft; an eccentric rotatable element in said frame interior; a yoke connecting said eccentric element and said shaft, said yoke having a planar guide for confining said eccentric rotatable element and an arcuate portion adapted to provide a tongue-and-groove fit on said circular shaft track in every rotational position of said shaft, whereby rotational movement of said eccentric rotatable element is converted into reciprocating movement of said shaft; and driving means to rotate said eccentric rotatable element.

4. A power driven device adapted to drive a reciprocating tool in any desired rotational position, comprising, in combination, a hollow frame having a cylindrical socket opening through its front wall said socket opening having a radial recess therein; a barrel, the rear end of which is engaged in said socket and is provided with an annular groove in line with said recess of said frame socket, said barrel having a longitudinal bore therethrough and in its rear end wall a guide pocket parallel to said bore; a ball in said recess; a spring held in said recess against said ball and urging said ball against said groove to prevent displacement of the barrel with respect to the frame while permitting free relative rotation; an overlength shaft slidably mounted in said bore, the front end of said shaft having a tool-supporting chuck; a collar secured adjacent the rear end of said shaft in the frame interior and having a circumferential groove therearound; an aligning pin projecting from the forward end of said collar and adapted to slide reciprocatingly in said guide pocket so that the rotational position of said shaft corresponds at all times with the rotational position of said barrel; a motor mounted to said frame; a rotating wheel positioned within the frame interior and adapted to be driven by said motor; an upstanding offset cam on said wheel; and a yoke mounted between said wheel and the collar on said shaft, the yoke having a plane camway arranged to confine the cam on rotation of its supporting wheel, and having an arcuate tongue shaped for reception in the groove of said collar in any rotational position of said shaft, the yoke thereby being adapted to convert rotational movement of the wheel into reciprocating movement of the shaft for any rotational position of the shaft and barrel.

5. A power tool adapted to drive a reciprocating tool in any desired rotational position with respect to its own frame and thereby making it unnecessary to turn the frame when making an angular cut, including in combination a hollow frame having a cylindrical socket opening through its front wall; a barrel with its rear end engaged in said socket for free rotation therein but against rotational displacement therefrom, said barrel having a longitudinal bore therethrough, the rear end wall of said barrel having a pocket therein parallel to said bore; an overlength shaft slidably mounted in said bore of said barrel, the front end of said shaft having a tool-supporting chuck; an aligning pin connected to said shaft in said frame beyond the rear end of said barrel and positioned to engage slidably in said pocket so that a change in the rotational position of said barrel also changes the rotational position of said shaft and its said chuck with respect to said frame; and means for reciprocating said shaft in its said barrel in any rotational position thereof, said pin then reciprocating in said pocket.

MARTIN L. BRIGGS.

REFERENCES CITED

The following references are of record in the file of this patent:

UNITED STATES PATENTS

| Number | Name | Date |
| --- | --- | --- |
| 245,149 | Fowler | Aug. 2, 1881 |
| 1,679,884 | Thomas | Aug. 7, 1928 |
| 1,775,692 | Plut | Sept. 16, 1930 |
| 2,037,303 | Battee | Apr. 14, 1936 |
| 2,206,614 | O'Hern | July 2, 1940 |
| 2,417,170 | Langfelder | Mar. 11, 1947 |